United States Patent
Herges

(10) Patent No.: US 8,740,577 B2
(45) Date of Patent: Jun. 3, 2014

(54) DAMPING COMPRESSOR AND METHOD FOR GENERATING COMPRESSED AIR BY DAMPING A RELATIVE MOTION BETWEEN AN AXLE AND A CHASSIS OF A VEHICLE

(75) Inventor: Michael Herges, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 15 days.

(21) Appl. No.: 13/251,659

(22) Filed: Oct. 3, 2011

(65) Prior Publication Data

US 2012/0107147 A1  May 3, 2012

Related U.S. Application Data

(63) Continuation of application No. PCT/EP2010/001740, filed on Mar. 19, 2010.

(30) Foreign Application Priority Data

Apr. 2, 2009 (DE) .......................... 10 2009 015 939

(51) Int. Cl.
  *F04B 19/00* (2006.01)
(52) U.S. Cl.
  USPC ...... 417/211; 417/233; 267/64.17; 267/64.28
(58) Field of Classification Search
  USPC ............ 417/211, 231, 233; 267/64.11, 64.17, 267/64.28
  See application file for complete search history.

(56) References Cited

U.S. PATENT DOCUMENTS

| 3,507,580 A | | 4/1970 | Howard et al. |
| 5,219,414 A | * | 6/1993 | Yamaoka ...................... 188/284 |
| 5,669,597 A | * | 9/1997 | Rittstieg et al. ............ 267/64.17 |
| 6,494,442 B2 | * | 12/2002 | Beck et al. ................. 267/64.17 |
| 6,776,269 B1 | * | 8/2004 | Schel ............................ 188/287 |

FOREIGN PATENT DOCUMENTS

| DE | 26 09 392 A1 | 9/1977 |
| DE | 198 55 229 A1 | 8/1999 |
| DE | 101 36 949 A1 | 3/2003 |
| DE | 10 2006 058 671 A1 | 3/2008 |
| DE | 10 2008 062 076 A1 | 6/2010 |
| EP | 1 249 357 A2 | 10/2002 |
| EP | 1 429 045 A2 | 6/2004 |
| FR | 942.178 | 2/1949 |
| WO | WO 2005/032863 A1 | 4/2005 |

OTHER PUBLICATIONS

International Search Report dated Jul. 15, 2010 including English-language translation (Four (4) pages).
German Office Action dated Nov. 16, 2010 including English-language translation (Six (6) pages).
International Search Report dated Juli 15, 2010 including English-language translation (Four (4) pages).

* cited by examiner

*Primary Examiner* — Charles Freay
*Assistant Examiner* — Patrick Hamo
(74) *Attorney, Agent, or Firm* — Crowell & Moring LLP

(57) ABSTRACT

A damping compressor generates compressed air by damping a relative motion between an axle and a chassis of a vehicle.

22 Claims, 10 Drawing Sheets

DAMPING COMPRESSOR AND METHOD FOR GENERATING COMPRESSED AIR BY DAMPING A RELATIVE MOTION BETWEEN AN AXLE AND A CHASSIS OF A VEHICLE

CROSS-REFERENCE TO RELATED APPLICATIONS

This application is a continuation of PCT International Application No. PCT/EP2010/001740, filed Mar. 19, 2010, which claims priority under 35 U.S.C. §119 from German Patent Application No. DE 10 2009 015 939.8, filed Apr. 2, 2009, the entire disclosures of which are herein expressly incorporated by reference.

BACKGROUND AND SUMMARY OF THE INVENTION

The present invention relates to a damping compressor and to a method for generating compressed air via damping.

The tires of commercial vehicles are usually supplied with compressed air. Nowadays, the energy which is required to generate compressed air is usually applied by the drive motor by way of a compressor. In commercial vehicles, this compressor should therefore supply sufficient compressed air to supply the tires both of the traction vehicle (tractor) and of the trailer. In this context, it is significant that commercial vehicle tires are often operated with air pressures above 9 bar.

The problem with the systems mainly used today is that, on the one hand, the energy which has to be applied by the drive motor to operate the compressor greatly reduces the achievable overall efficiency level, i.e. the efficiency level is only a few percent and, on the other hand, with these systems the trailer can only be supplied with compressed air up to 9 bar by the traction vehicle. In order to ensure the correct tire pressure also in the trailer, automatic tire pressure control systems are being increasingly used. However, these systems require additional expenditure to increase the pressure.

At the same time, when a commercial vehicle is operated, the chassis of the vehicle should be damped in order to ensure reliable driving dynamics. The method of functioning of currently used systems can be considered to be equivalent to the conversion of motion energy into heat.

An approach which is known in the prior art uses a pneumatic booster to increase the pressure for a tire pressure control system. However, the use of such a booster or air quantity/air pressure booster degrades the efficiency level of such a system further.

There is therefore needed an improved device for generating compressed air in a vehicle.

The present invention is based on the idea that vibrations of the vehicle lead to a relative stroke motion between the chassis and axle which is transmitted to two elements of a damper (for example, a shock absorber) of the vehicle. This relative stroke motion between the two elements can be used to change an air volume between the elements and therefore generate compressed air as a damping compressor. In particular, with the proposed approach it is possible for the zero crossing of the elements during the spring compression and spring extension to define a central position or position of rest in which an air volume between the elements is at a minimum or is not present. As a result, a dead space between the elements is minimized and, as a result, a pumping effect is achieved with approximately each spring compression stroke and/or spring extension stroke, allowing the efficiency level of such a compressor to be maximized.

It is advantageously possible for the use of the energy which is released during damping to generate compressed air, therefore providing savings in terms of the fuel which would be required to operate a compressor in order to generate compressed air by means of the drive motor. Given such a combination of a damper and a compressor, the use of a separate (for example hydraulic) damper and of a separate compressor also becomes unnecessary, as a result of which the manufacturing costs when using the proposed approach can be reduced. A further advantage is achieved by virtue of the fact that the damper is not so strongly heated because the majority of the damping energy is not converted into heat but rather stored as compressed air. Since the system which is proposed here can be used, in particular, also in the trailer of a commercial vehicle, a widely selectable pressure level can be set in components of the trailer independently of the traction vehicle. Even a complete or at least partial compressed air supply of the traction vehicle by components of the trailer is possible. This means that under certain circumstances it is possible to completely dispense with the compressor in the traction vehicle (or it can be at least simplified and/or made smaller).

In this way, the damping compressor can be advantageously used as a redundant safety system for the traction vehicle compressor and therefore for increasing the failsafety of the traction compressor.

Since the air which is to be used for the generation of compressed air is preferably obtained from a buffer which can be connected to the damping compressor, changing the air pressure in such a buffer also allows variable damping by virtue of pressure levels which can be set to different values. Since this system for generating compressed air mainly makes use of the components which are used in any case in a shock absorber, and hardly any additional elements are required, the design and structure of the approach which is proposed here can be kept simple. Using the energy which has been produced by the damping of a vehicle to generate compressed air is therefore both economically and ecologically very sensible.

The present invention therefore provides a damping compressor which is designed to generate compressed air by damping a relative motion between an axle and a chassis of a vehicle.

According to one specific embodiment of the invention, the damping compressor has the following features:

(a) a compressor arrangement which comprises a first element and a second element, wherein the first element can be connected to the axle or to the chassis of the vehicle, and the second element can be connected to the other of the chassis or the axle of the vehicle, wherein the arrangement is designed, to change an air volume between the first element and the second element in order to generate the compressed air in the case of a relative stroke motion between these elements, wherein the compressor arrangement also has a minimum of the air volume or no air volume between the first and second elements in a position of rest;

(b) a driver element which is designed to bring about an increase in air volume in the case of a relative motion between the axle and the chassis by entraining the first element in a stroke direction; and (c) a restoring element which is designed to move the first element counter to the stroke direction, as a result of which a reduction in the air volume is brought about and the compressed air is expelled from the compressor arrangement.

Such an embodiment of the invention provides the advantage that by virtue of the use of two elements which can be moved relative to one another, a position of rest in which an air volume between the elements tends toward zero can be achieved for both elements. As a result, a maximum efficiency level of the approach according to the invention can be achieved. The two elements which are used can be two movable pistons which act as a pressure-generating piston and as a corresponding piston. Alternatively, a container wall or a container floor can also be used as first and second elements of the damping arrangement in the context of a movable piston. The restoring element easily permits the first element to reliably reach the position of rest again.

According to a further embodiment of the invention, the driver element can be designed to bring about an increase in the air volume in the case of a further relative motion between the axle and the chassis by entrainment of the second element in a direction which is opposed to the stroke direction, wherein the damping compressor has a further restoring element which is designed to move the second element in the stroke direction, as a result of which a reduction in the air volume is brought about and the compressed air is expelled from the compressor arrangement. Such an embodiment of the invention provides the advantage of continuous use of the proposed principle of the generation of compressed air since the stroke of the one element is directly followed by the stroke of the second element which immediately initiates a gain in compressed air again. As a result, a motion of the driver element which is opposed to the stroke direction beyond the position of rest of one of the elements, i.e. a motion in the stroke direction and a motion in the direction counter to the stroke direction, can also be utilized to generate compressed air. This leads to a significant extension of the possibility for generating compressed air and therefore to an improvement in the efficiency level of the damper compressor.

According to a further embodiment of the invention, the driver element can be embodied in a rod shape with a thickened portion, wherein the thickened portion can be arranged on the rod-shaped element in such a way that the thickened portion is arranged between the first element and the second element. This advantageously permits the two elements to move in opposite directions with merely one driver element, which, by virtue of the rod-shaped embodiment, is also particularly flexurally strong with respect to the traction forces and compression forces which occur.

According to a further embodiment of the invention, the driver element is led through at least the first element and/or the second element. The first and/or second element are therefore guided along the motion axis of the damping compressor according to the invention, as a result of which a relative motion between the chassis and the axle results in the largest possible stroke motion of the first element with respect to the second element.

According to a further embodiment, the restoring element and/or the further restoring element can be a spring. This provides the advantage that elements which involve already mature technology, are widely available, and are cost-effectively available, can be used.

According to a further embodiment of the invention, the damping compressor has an inlet valve which is designed to let air from external surroundings of the damping compressor and/or from an air container, in particular a spring bellows, into the air volume between the first element and the second element, during the relative stroke motion. The extraction of the air from the air container has the advantage that air which has already been cleaned and dried is available and can be re-used easily and efficiently. Extraction of the air from the external surroundings of the damping compressor has the advantage that it is possible to make available, for example for tires, a compressed air supply which is independent of the air supply of the traction vehicle, or even to assume the function of supplying compressed air to the traction vehicle.

When the invention is configured in the form that the air which is used for changing the air volume between the two elements is sucked in directly from the atmosphere, said air is preferably cleaned before use since it may contain dirt and water. Dirt can be removed by means of a suitable air filter upstream of the damping compressor in the direction of flow. There are various ways of drying the air, wherein the first way may be that it can firstly be compressed to a significantly higher pressure than that required by the load system and can be stored in a buffer. It cools down here, as a result of which the water contained therein condenses and can be discharged via a manually or automatically acting discharge valve. Starting from the buffer, the air can be relaxed by means of a pressure control valve to the pressure required by the load system and can be fed to the load system. The reduction in pressure causes the relative humidity of the air to drop. This procedure also makes it possible to influence the damping effect by varying the pressure in the buffer. Although this procedure has a relatively low efficiency level, there is generally much more damping energy available in any case than is required for the air supply for generating compressed air. According to another embodiment, a conventional air dryer, which is regenerated from time to time, may be connected downstream. A continuously acting diaphragm dryer may be connected downstream as a further alternative.

The air which is to be used for the change in volume between the elements can preferably be sucked in from a reservoir which is supplied by the traction vehicle. The air should then only be subsequently compressed to the relatively high supply pressure or for the tire pressure control system. Since the air has already been conditioned by the traction vehicle, it is then no longer necessary to perform drying or cleaning.

According to another embodiment, the air can also be sucked in from a low pressure reservoir which collects, in a closed system, the air which has been discharged by other systems, for example the air suspension system, brake system or tire, which air was originally supplied by the traction vehicle. The air is also already conditioned by the traction vehicle here. It is no longer necessary to perform drying or cleaning.

Of course, a combination of the various ways of sucking in air, some of which are mentioned above, may also be done, with the result that, on the one hand, air can be sucked in from the atmosphere but, on the other hand, air can also be made available by a reservoir which is supplied by the traction vehicle, or air can be made available from a low pressure reservoir.

According to a further embodiment of the invention, the damping compressor has an outlet valve in the first element and/or second element, which outlet valve is designed to eject the compressed air into a compressed air accumulator. In particular, the outlet valve can be embodied as a nonreturn valve such as, for example, a reed valve. This provides the advantage that the air volume between the first and second elements can be kept as small as possible, since the compressed air which is generated can escape from the air volume while the pressure generated is maintained by the first and/or second element.

According to a further embodiment of the invention, the compressed air accumulator is designed to make available compressed air in order to move the first element counter to the stroke direction and/or to move the second element in the stroke direction, as a result of which a reduction in air volume is brought about and the compressed air is generated. In this way, the compressed air in the compressed air accumulator can advantageously be used to attenuate the relative motion of the axle with respect to the chassis.

According to a further embodiment of the invention, the first element and the second element are each formed by a piston. It is to be considered advantageous here that two virtually identical components can be used to generate compressed air. Furthermore, such a configuration permits technically a very simple generation of compressed air both during spring compression and spring extension.

According to a further embodiment of the invention, the damping compressor has a guide element which is designed to receive and to guide the first element and the second element during a relative motion between the axle and the chassis, wherein the guide element has at least one shoulder on an inner wall, on which shoulder the first element and the second element bear in the position of rest. The guide element can be, for example, a cylinder in which the first and/or second elements move. Such an embodiment of the invention can assist guidance of the first and/or second elements along the motion axis of the damping compressor. The use of such a shoulder which is technically easy to manufacture provides the advantage that its use allows the position of rest to be easily defined and permits a volume which tends towards zero between the first and second elements to be achieved in the position of rest in combination with the restoring elements.

According to one alternative embodiment of the invention, the first element and the second element are each formed via a cylinder, wherein the cylinders are arranged one in the other and the bottom of the cylinder which is arranged on the inside acts as a piston. Such an arrangement provides the advantage of ease of maintenance during which, if appropriate, the cylinders can easily be replaced.

According to one alternative embodiment of the invention, the damping compressor has a guide element which is designed to receive and to guide the first element and the second element during a relative motion between the axle and the chassis, wherein the cylinder which is arranged on the inside has a holding unit which is designed to fit onto an outer surface of the guide element in order to define the position of rest of the cylinder which is arranged on the inside, and wherein the cylinder which is arranged on the outside has a cylinder wall which is designed to fit on an inner wall of the guide element in order to define the position of rest of the cylinder which is arranged on the outside. Such an embodiment has the advantage that the position of rest can be defined precisely both for the inner and for the outer cylinders in a simple manner.

According to a further embodiment of the invention, a length of the driver element can be adjusted, in particular by use of an electric spindle drive and/or a hydraulic intermediate element. A position of rest for the first and/or second elements can advantageously therefore be set even if no air suspension system or another suspension system of the commercial vehicle which allows the position of rest to be permanently set is used.

The present invention also provides a method for generating compressed air by damping a relative motion between an axle and a chassis of a vehicle, wherein the method uses a compressor arrangement which comprises a first element and a second element, wherein the first element can be connected to the axle or the chassis of the vehicle, and the second element can be connected to the other of the chassis or the axle of the vehicle. The compressor arrangement is designed to change an air volume between the first element and the second element in order to generate the compressed air in the case of a relative stroke motion between these elements. The compressor arrangement also has a minimum of the air volume or no air volume between the elements in a position of rest. The method comprises the following steps:

(a) increasing the air volume in the case of a relative motion between the axle and the chassis by entraining the first element in a stroke direction; and (b) moving the first element counter to the stroke direction, as a result of which a reduction in the air volume is brought about and the compressed air is discharged from the compressor arrangement.

This embodiment variant of the invention in the form of a method also makes it possible for the problem underlying the invention to be solved quickly and efficiently.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
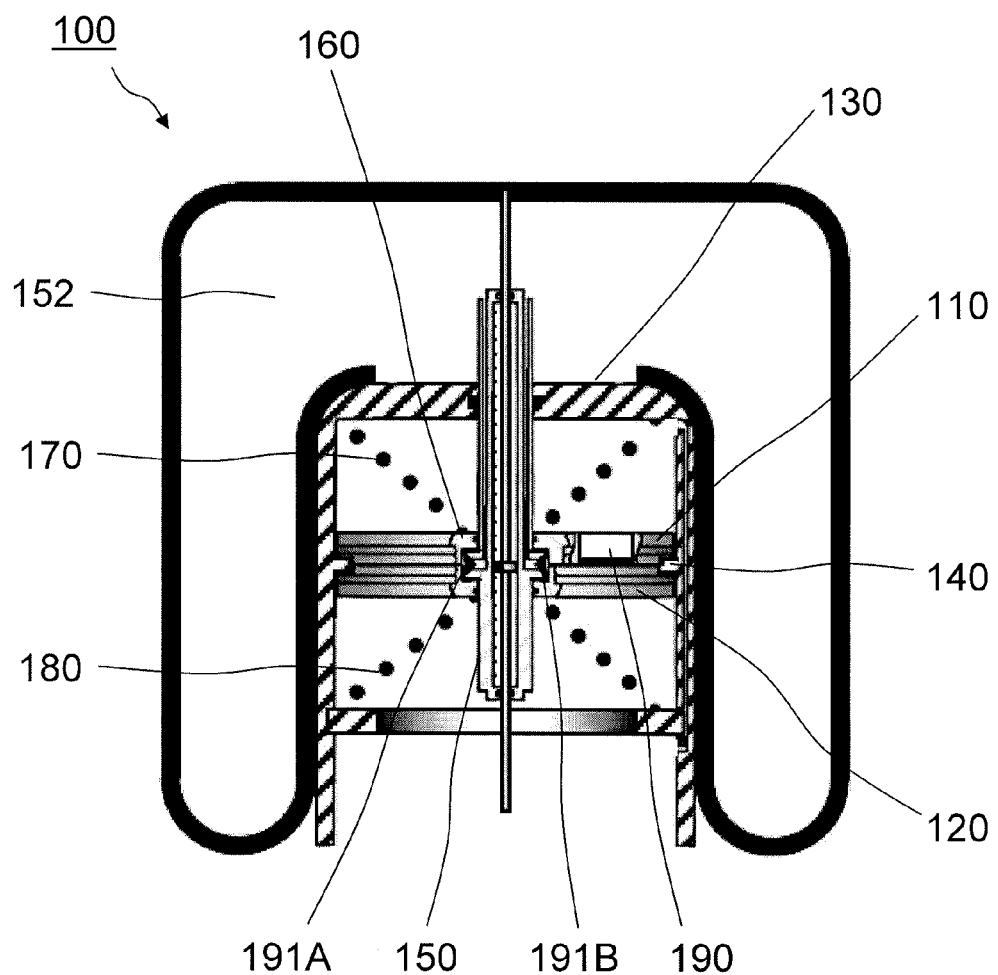
FIG. 1A is a sectional view through a first exemplary embodiment of the damping compressor according to the invention along a longitudinal axis, wherein a first and a second element of the compressor arrangement are in a state of rest.

In the following description of the preferred exemplary embodiments of the present invention, identical or similar reference symbols are used for the similarly acting elements which are illustrated in the various figures, wherein these elements are not described again. The described exemplary embodiments are selected only by way of example and can be combined with one another.

The method of functioning of an exemplary embodiment of the damping compressor according to the invention is explained generally below.

A variable air volume can be arranged between the chassis and axle of a vehicle or between elements which are connected to the chassis or the axle in such a way that a change in the distance between the axle and the chassis brings about a change in the air volume. This change in volume acts as a compressor. Since air is a compressible medium, in order to generate compressed air the sucked-in air should firstly be compressed to the desired final pressure and then ejected from the compressor space. At the end of such a cycle, the remaining volume in the compressor should be minimized since the air remaining there is not delivered—that is to say ejected—but instead remains in the compressor volume.

If, for example, a compressor ratio of 1:12 is assumed, in a rough approximation the volume should firstly be reduced to one 12th before delivery of air starts at all. Thus, if the minimum achievable compressor volume were, for example, one 24th of the maximum volume, only half the compressed air would also be delivered. The rest would relax again when there was subsequent expansion of the compressor volume. If the minimum achievable compressor volume were, for example, only one 10th of the maximum volume, no compressed air would be delivered at all. Since the stroke of the spring compression and spring extension during driving depends on factors such as vehicle speed, state of the road, tire qualities and the like, the stroke is not a fixed variable. However, spring compression and spring extension phases always alternate and there is thus always a "zero crossing", i.e., the motion virtually always passes through a central distance between the axle and the chassis.

In one particularly favorable exemplary embodiment, the compressor is embodied in such a way that in this central position or position of rest, that is to say at the distance which occurs when the vehicle is stationary or which arises as a statistical, average distance during travel, the compressor volume tends toward zero. Any increase and/or decrease in this distance (that is to say when spring compression and/or spring extension occur) increases this volume and air is sucked in from the atmosphere or from some other space. Before each "zero crossing", compressed air is delivered. This always functions at least when the increase in volume due to the spring compression or spring extension is larger than the minimum volume multiplied by the compression ratio. The minimum volume can also be referred to as "dead space". If the dead space is minimized consistently, a pumping effect is achieved at virtually every spring compression and/or spring extension stroke. When the air is compressed, force counter to the spring compression travel or spring extension travel (that is to say energy) is required and is therefore extracted from the vertical motion. This extraction of energy from the vertical motion acts as damping of the motion. Even during sucking in, energy is consumed, and said energy increases the damping effect. In the exemplary embodiment presented above, this energy is therefore not converted into heat as in the case of a conventional damper but rather stored in the form of compressed air.

The damper effect is dependent both on the change in volume which is possible per spring travel and on the level of the pressure which can be made available for the generation of compressed air. The damper effect can therefore in principle be easily adapted to different driving states such as the speed, load, state of the carriage etc. by varying the pressure.

The basic design principle of a favorable exemplary embodiment of the damper compressor according to the invention can be described as follows.

A piston cylinder arrangement is arranged between the chassis and the axle of a vehicle, or part of the arrangement is connected to the chassis and the other is connected to the axle of the vehicle. In this arrangement, an air volume which tends towards zero is formed between the axle and the chassis in the piston-cylinder arrangement at a zero position of the axle suspension or a position of rest. During the spring compression and/or spring extension, the parts move with respect to one another in such a way that an increase in volume occurs between them and air is sucked in via a valve (for example, an automatically acting nonreturn valve arrangement). At the next motion of the axle in the opposite direction with respect to the chassis, the volume is reduced again, wherein the previously sucked-in air is firstly compressed and then ejected via a valve (for example, an automatically acting nonreturn valve arrangement such as a reed valve) when the zero position is approached.

In order to describe the invention in more detail, an advantageous exemplary embodiment of the present invention will be described on the basis of FIGS. 1 to 4.

FIG. 1A shows here a sectional view along a longitudinal axis of an exemplary embodiment of a damper compressor 100 according to the invention. The damper compressor 100 has a compressor arrangement with a first element 110 and a second element 120. In this context, both elements may be, for example, pistons (as is illustrated in the following figures) or one of the elements can be, for example, a piston and the other element can be, for example, a cylinder floor if the compressed air is to be generated only in the case of spring compression or spring extension (which is, however, not described further in the exemplary embodiment in FIGS. 1 to 4).

The first element 110 can be connected to an axle or a chassis of a vehicle and the second element 120 can be connected to the other of the axle or the chassis of the vehicle. The first element 110 and the second element 120 can be arranged in a guide element 130 which can have, on an inner wall, at least one shoulder 140 or projection, but better two shoulders at locations lying opposite one another on the inner wall, at which shoulder or shoulders the first element 110 and/or the second element 120 bear/bears in a position of rest. The elements 110 and 120 can be received in the guide element 130 in such a way that a circumferential edge of the elements 110 and 120 forms a fluid-tight termination with respect to the inner wall of the guide element 130.

In the illustration in FIG. 1A, it is apparent that a rod-shaped driver element 150 is provided which has a thickened portion 160 which is arranged between the elements 110 and 120, wherein the driver element projects into the damper compressor 100 and penetrates the first element 110 and/or second element 120. The driver element 150 can be connected here to the chassis via a spring bellows 152, while the guide element 130 can be connected to the axle of the utility vehicle. A restoring element 170 (which is embodied as a helical spring in the exemplary embodiment according to FIG. 1A) can, in a position of rest, hold the first element 110 pressed against the at least one shoulder 140, and a further restoring element 180 (which is also embodied as a helical spring in the exemplary embodiment according to FIG. 1A) can, in a position of rest, hold the second element 120 pressed against the at least one shoulder 140 from the opposite side. The interaction of the elements 110 and 120, of the at least one shoulder 140 and of the restoring elements 170 and 180 constitutes, in the position of rest of the elements 110 and 120, a volume which tends towards zero or a dead space between the elements 110 and 120 which tends towards zero.

An outlet valve 190 which permits previously sucked-in and compressed air to be ejected can be arranged in the first element 110 and/or in the second element 120. In the exemplary embodiment shown in FIG. 1A, the outlet valve 190 is arranged merely in the first element 110. A first inlet valve 191A and a second inlet valve 191B are arranged on the thickened portion 160, via which inlet valves 191A and 191B air can be let in from outer surroundings (for example from the spring bellows 152 via a guide rail of the driver element 150) into the air volume between the first element 110 and the second element 120 during a stroke motion of the first element 110 and/or the second element 120.

Figure 1B:
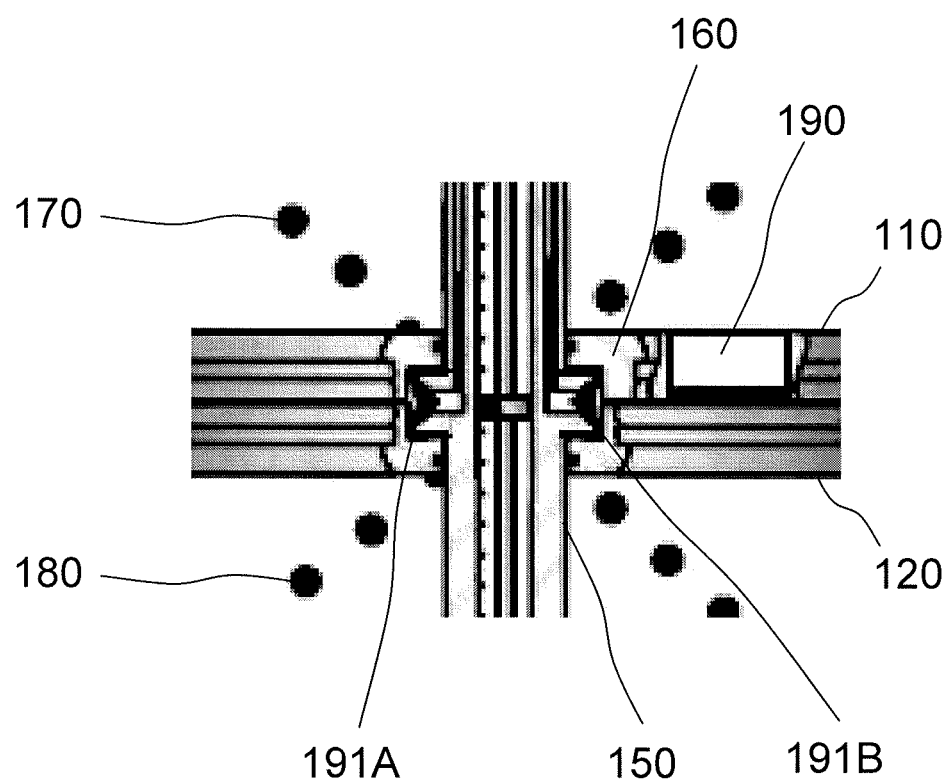
FIG. 1B is a view of an enlarged partial detail from FIG. 1A.

FIG. 1B shows an enlarged illustration of a partial detail of FIG. 1A. In particular, in FIG. 1B it is possible to see better the arrangement of the inlet valves 191A and/or 191B and the outlet valve 190.

Figure 2A:
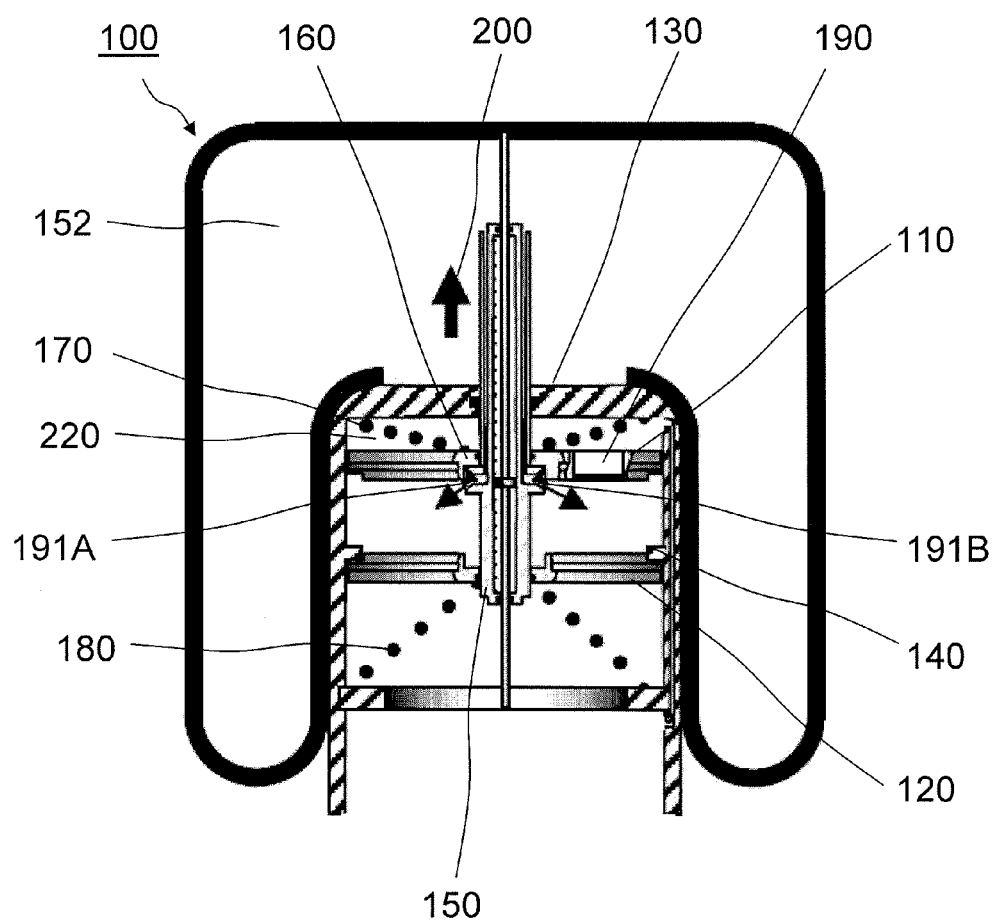
FIG. 2A is a further sectional view along the longitudinal axis of an exemplary embodiment of the damping compressor according to the invention, wherein the first element of the compressor arrangement is in a working position and the second element of the compressor arrangement is in the position of rest.

FIG. 2A shows an analogous illustration to FIG. 1A, with the first element 110 being shown here in a working position. As is apparent from the illustration in FIG. 2A, a relative stroke motion between the chassis and the axle of the vehicle causes the thickened portion 160 to entrain the element 110 in a specific stroke direction 200. Owing to the partial vacuum which now occurs between the elements 110 and 120, air is sucked into the air volume or the space between the elements 110 and 120 from an outer space, for example the spring bellows 152 (or from the atmosphere or a further air reservoir via an intake hose which is not illustrated in the specified figures) through a first inlet valve 191A and/or a second inlet valve 191B. The inlet valves 191A, 191B are preferably formed by a nonreturn valve arrangement, for example a rubber ring with lips which can fold away radially. This is illustrated in an enlarged form in FIG. 2B. It is also possible to use just one such inlet valve.

The stroke motion of the first element 110 in the upward direction brings about compression of a gas in the space 220 above the first element 110 and the guide element 130, as a result of which there is an increase in pressure in this space 220 of the guide element 130. Contrary to the illustration in FIGS. 2A and 2B, a minimum of the space 220 which results from the stroke motion of the first element 110 may be larger than a maximum of the air volume between the elements 110 and 120.

Figure 2B:
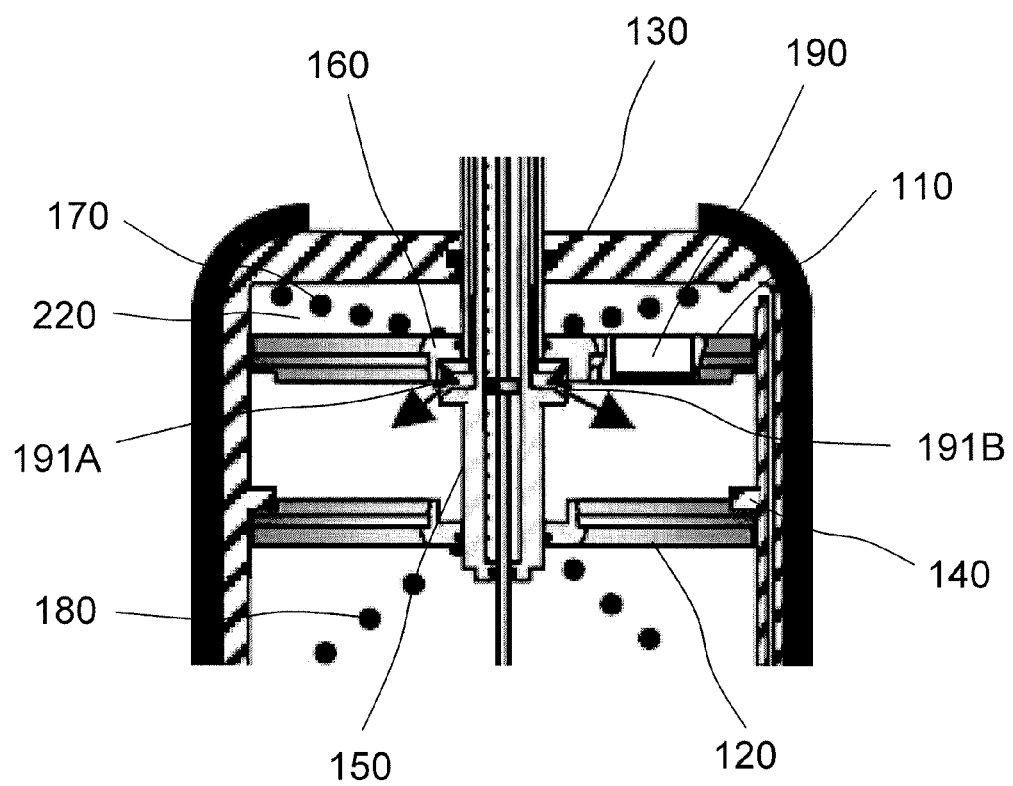
FIG. 2B is a view of an enlarged partial detail of FIG. 2A.
Figure 3:
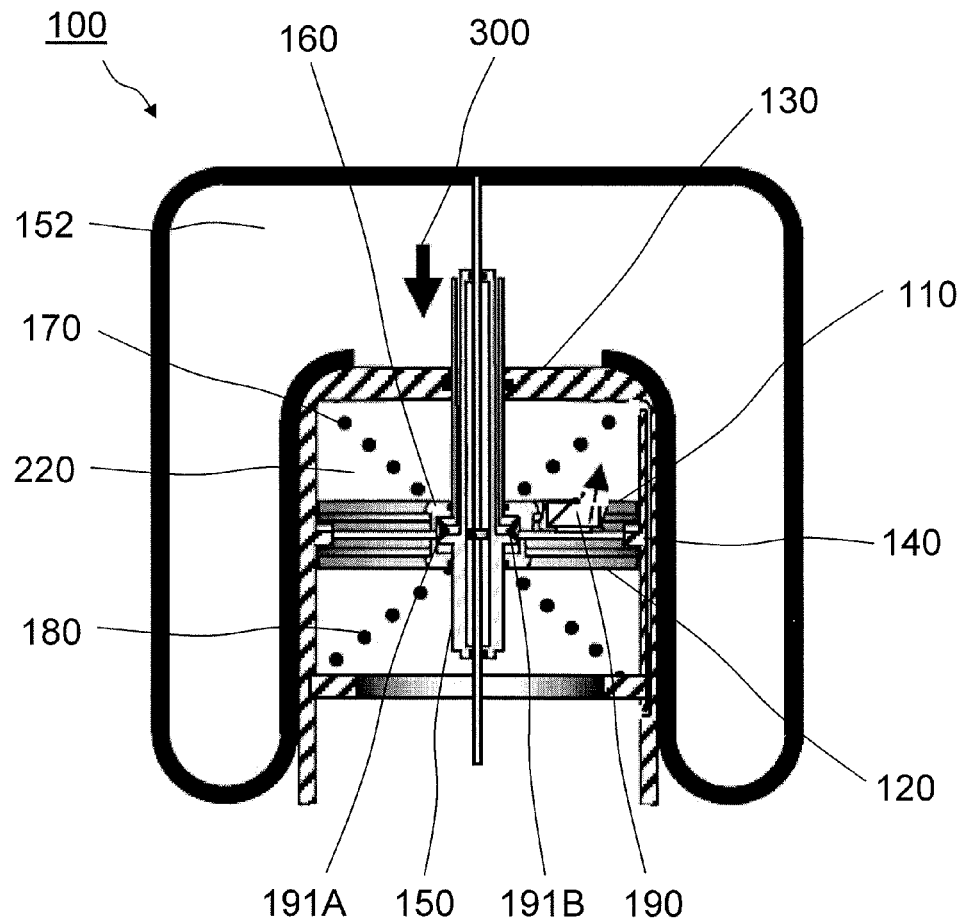
FIG. 3 is a further sectional view along the longitudinal axis of an exemplary embodiment of the damping compressor according to the invention, wherein the first element of the compressor arrangement is again in the position of rest and compressed air is ejected from the air volume between the first and second elements through an outlet valve in the first element.

In a working step which follows the working step illustrated in FIGS. 2A and 2B, the sucked-in air is compressed in the compressor arrangement. This step is shown in FIG. 3. A reversal of the relative stroke motion between the axle and the chassis of the vehicle moves the driver element 150 in a direction 300 contrary to the stroke direction 200, and the thickened portion 160 releases the first element 110. As a result of the increased pressure in the space 220 (with support of the restoring element 170), the first element 110 can now be moved closer to its position of rest in the direction 300. In this context, the previously sucked-in air is compressed. As soon as the pressure in the space 220 reaches a value equivalent to the pressure in the air volume between the first element 110 and second element 120, the restoring element 170, which is, for example, a helical spring, can, for example, overcome a frictional force and press the first element 110 completely back into its position of rest, with the result that the air volume between the elements 110 and 120 tends toward zero, and the compressed air in the air volume is ejected as compressed air from the outlet valve 190 into a compressed air accumulator (which is not shown in FIG. 3). The outlet valve 190 can be embodied here, for example, as an automatically acting nonreturn valve arrangement, in particular as a reed valve.

Figure 4:
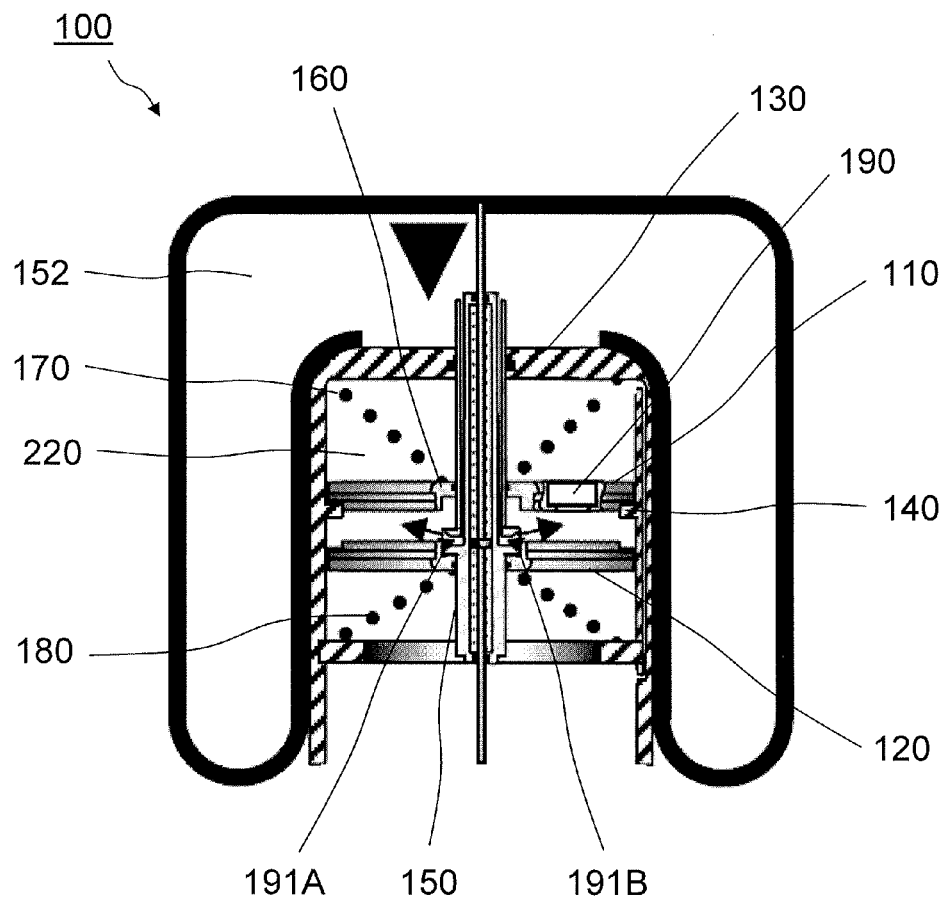
FIG. 4 is a further sectional view along the longitudinal axis of an exemplary embodiment of the damping compressor according to the invention, wherein the first element of the compressor arrangement is in the position of rest and the second element of the compressor arrangement is in a working position.

A continuation of the relative motion between the axle and the chassis of the vehicle (illustrated in FIG. 3) brings about entrainment of the second element 120 by the thickened portion 160 of the driver element 150, as is shown in FIG. 4. The motion sequence which is described in FIGS. 2A and 3 then takes place in an analogous fashion in the opposite direction, as a result of which compressed air can be delivered both during the spring compression motion and during the spring extension motion between the chassis and the axle.

The exemplary embodiment mentioned above uses here a fixed cylinder as a guide element with two pistons as the first element 110 and second element 120. The method of functioning of this exemplary embodiment is described once more below using different words and in a summarizing fashion with respect to the design and function for the sake of better clarity.

In a cylinder 130, which is attached to the axle or chassis—in a possibly pivotable fashion (not illustrated in the figures), there are two pistons 110 and 120. On an opposing side (chassis or axle), a rod-shaped element 150 is attached—possibly also in a pivotable fashion—and said rod-shaped element 150 projects into the cylinder 130. The inner wall of the cylinder has approximately in the center a shoulder 140 which bounds the travel of the upper piston 110 in the downward direction and of the lower piston 120 in the upward direction, with the result that a zero position or position of rest, in which the two pistons 110, 120 bear on this shoulder 140, results for said pistons 110, 120. The pistons 110, 120 are configured such that in the zero position the volume between them is as small as possible. The rod-shaped element 150 penetrates at least the piston 110 facing it and has a thickened portion 160 which is arranged between the two pistons 110, 120. If the axle moves relative to the chassis, the rod-shaped element 150 also moves relative to the cylinder 130 and entrains one of the pistons 110, 120. As a result, the volume between the two pistons 110, 120 is increased. Air is sucked in through a nonreturn valve arrangement 191A, 191B—in the example a rubber ring with lips which can fold away radially. During the opposing motion, this piston is pressed back again into its zero position by the application of pressure on the side 220 facing away from the other piston, by means of a spring 170, and in the process the piston compresses the previously sucked-in air and finally ejects it via a further nonreturn valve arrangement 190—here a reed valve in the piston 110 itself—into the space 220 which is to be supplied with pressure. If the relative motion continues, the other piston 120 is entrained by the rod-shaped element 150 and the procedure is correspondingly repeated with the other piston 120.

Figure 5:
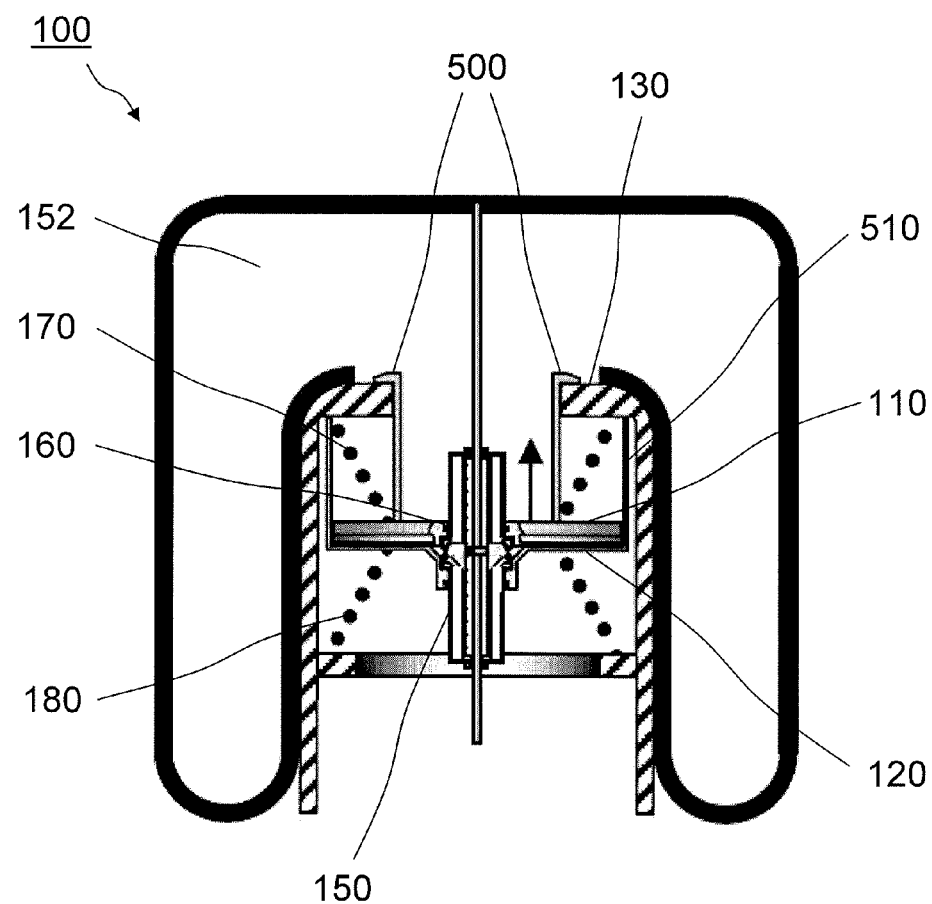
FIG. 5 is a further sectional view along a longitudinal axis of an alternative exemplary embodiment of the damping compressor according to the invention, wherein a first and a second element of a compressor arrangement are in a position of rest.

FIG. 5 illustrates a further sectional view along a longitudinal axis of an alternative exemplary embodiment of the damper compressor according to the invention, wherein a first element 110 and a second element 120 of a compressor arrangement are located in a position of rest. The inner wall of the guide element 130 does not have a shoulder 140 here. The first element 110 is embodied as a cylinder which has a holding unit 500. The holding unit 500 is configured in such a way that a wall of the first element 110 penetrates the guide element 130, and an upper edge of this wall of the first element 110 is bent radially outward. This radially outwardly bent upper edge 500 bears against an upper outer wall of the guide element 130. The second element 120 is also embodied as a cylinder which has a wall 510. In the position of rest, the first element 110 is arranged within the second element 120, wherein the floor of the first element 110 bears on the floor of the second element 120. The position of rest is reached by means of the restoring elements 170 and 180, which apply a compressive force to the first element 110 and the second element 120. The compressive force respectively causing the holding unit 500 to bear on an outer wall of the guide element 130 and the (cylinder) wall 510 of the outer cylinder to bear on an upper side of the inner wall of the guide element 130.

In vehicles in which a fixed vehicle ride level is applied by the type of suspension (for example, an air suspension), the zero position of the damper compressor can also be permanently predefined by structural means. For vehicles without such automatic control of the vehicle ride level it is, however, also possible to control the zero position actively by electrical means, for example by using a spindle drive to vary the length of the rod-shaped element 150.

A favorable solution for varying the length of the rod-shaped (driver) element 150 can also consist in using a hydraulic intermediate element 600, as is already illustrated in FIGS. 1 to 5, wherein the length of the rod-shaped element 150 is set automatically. This intermediate element 600 is composed, for example, of an oil-filled cylinder and a piston with a small throttle opening. The throttle allows only a very small amount of oil to pass through, with the result that high-frequency spring compression and spring extension processes such as occur during travel cause no, or virtually no, change in length but displacements of the central distance between the axle and chassis which occur over a relatively long time are automatically compensated since the pistons are prestressed in the direction of the zero position and in this way the pistons 110 and 120 slowly move toward the zero position or position of rest as a result of the pressure equalization in the oil-filled cylinder by means of the throttle opening.

Figure 6:
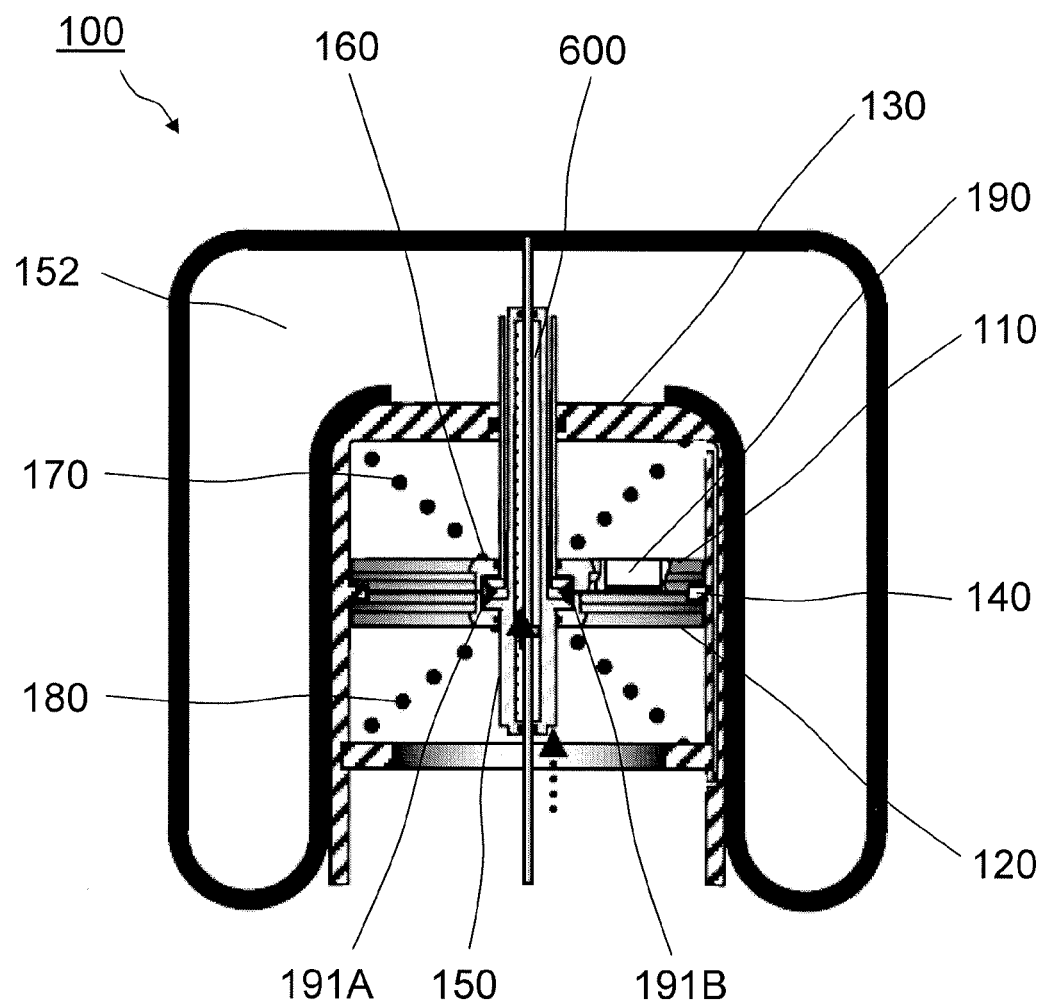
FIG. 6 is a further sectional view along the longitudinal axis of an exemplary embodiment of the damping compressor according to the invention.

FIG. 6 again illustrates, on the basis of an exemplary embodiment, how the rod-shaped element or driver element 150 is electrically activated or adapted in terms of its length (in particular, shortened in accordance with the direction of the arrows) using a hydraulic intermediate element.

Figure 7:
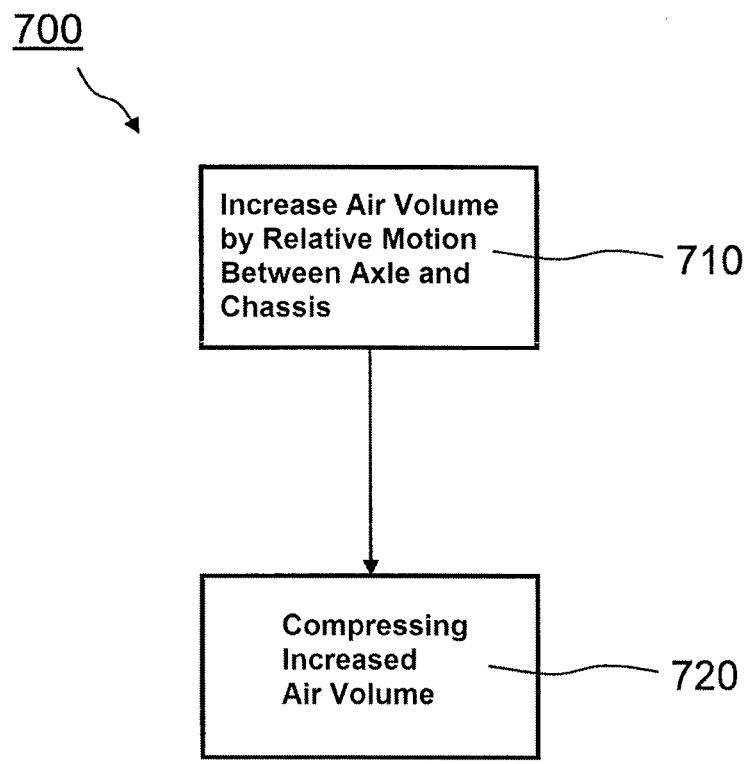
FIG. 7 is a flowchart of an exemplary embodiment of a method according to the invention.

In addition, the present invention provides a method 700 for generating compressed air by damping a relative motion between an axle and a chassis of a vehicle, wherein a flow-chart of an exemplary embodiment of the method is illustrated in more detail in FIG. 7. The method 700 comprises a first step of increasing 710 the air volume when there is a relative motion between the axle and the chassis by entraining the first element 110 in a stroke direction. Furthermore, the method comprises a second step of moving 720 the first element 110 counter to the stroke direction 200, as a result of which a reduction in the air volume is brought about and the compressed air is discharged from the compressor arrangement 110, 120.

Figure 8:
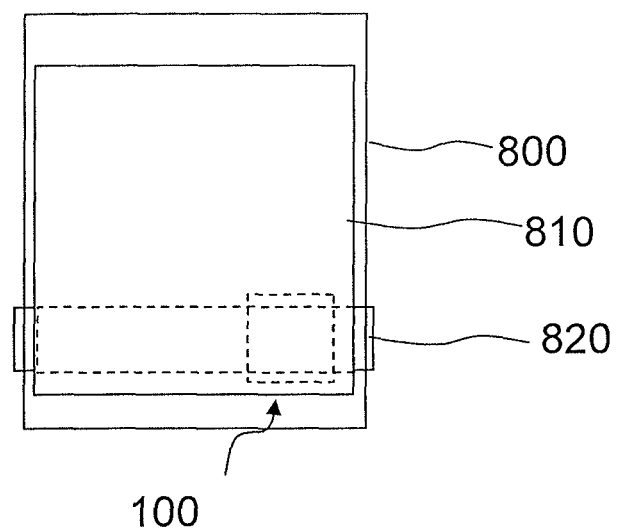
FIG. 8 is a schematic plan view of an exemplary embodiment of a vehicle according to the invention.

FIG. 8 shows a schematic plan view of a vehicle 800 with an exemplary embodiment of a damper compressor 100 arranged between an chassis 810 of the vehicle and the axle 820 of the vehicle 800.

TABLE OF REFERENCE NUMBERS

100 Damper compressor
110 First element
120 Second element
130 Guide element
140 Shoulder
150 Driver element
152 Spring bellows
160 Thickened portion
170 First restoring element
180 Second restoring element
190 Outlet valve
200 Stroke direction
191A First inlet valve
191B Second inlet valve
220 Space of the guiding element above the first element 110
300 Direction counter to the stroke direction
500 Holding unit
510 Cylinder wall
600 Hydraulic intermediate element
700 Method for generating compressed air
710 Step of increasing the air volume
720 Step of moving the first element counter to the stroke direction to compress air volume The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for generating compressed air, the apparatus comprising:
   a damping compressor operatively coupleable with an axle and a chassis of a vehicle, wherein the damping compressor is configured to generate compressed air via damping of a relative motion between the axle and the chassis of the vehicle;
   wherein the damping compressor comprises:
      a compressor having first and second elements, the first element being connectable to the axle and the second element being connectable to the chassis or the first element being connectable to the chassis and the second element being connectable to the axle;
      a minimum or no air volume space arranged between the first and second elements when said elements are in a position of rest;
      a driver element operatively configured to increase an air volume upon relative motion between the axle and the chassis by entraining the first element in a stroke direction; and
      a restoring element operatively configured to move the first element counter to the stroke direction, in which case a reduction in the air volume occurs and compressed air is expelled from the compressor.

2. The apparatus according to claim 1,
   wherein the driver element is further operatively configured to increase an air volume upon further relative motion between the axle and the chassis by entrainment of the second element in a direction opposed to the stroke direction; and
   wherein the compressor further comprises an additional restoring element operatively configured to move the second element in the stroke direction, in which case a reduction in the air volume occurs and the compressed air is expelled from the compressor.

3. The apparatus according to claim 1, wherein the driver element is a rod having a thickened portion, said thickened portion being arranged on the rod in an area between the first and second elements.

4. The apparatus according to claim 2, wherein the driver element is a rod having a thickened portion, said thickened portion being arranged on the rod in an area between the first and second elements.

5. The apparatus according to claim 1, wherein the driver element extends through at least one of the first and second elements.

6. The apparatus according to claim 4, wherein the driver element extends through at least one of the first and second elements.

7. The apparatus according to claim 1, wherein the restoring element is a spring.

8. The apparatus according to claim 2, wherein at least one of the restoring element and the additional storing element is a spring.

9. The apparatus according to claim 1, wherein the compressor further comprises:
at least one inlet valve operatively configured to let air into the air volume space between the first and second elements during the relative stroke motion.

10. The apparatus according to claim 9, wherein the air let into the air volume space is from at least one of an atmosphere surrounding the compressor and an air container.

11. The apparatus according to claim 10, wherein the air container is a spring bellows.

12. The apparatus according to claim 9, wherein the compressor further comprises an outlet valve in at least one of the first and second elements, said outlet valve being operatively configured to pass the compressed air into a compressed air accumulator.

13. The apparatus according to claim 12, wherein the compressed air accumulator is operatively configured to make available the compressed air in order to move at least one of the first and second elements counter to their respective stroke directions, in which case a reduction in air volume occurs and compressed air is generated.

14. The apparatus according to claim 1, wherein the first and second elements are first and second pistons, respectively.

15. The apparatus according to claim 14, wherein the compressor further comprises:
a guide element operatively configured to receive and guide the first and second pistons during relative motion between the axle and the chassis; and
wherein the guide element has at least one shoulder on an inner wall, the first and second pistons bearing against the at least one shoulder in the position of rest.

16. The apparatus according to claim 1, wherein the first and second elements are each formed as a cylinder, the cylinders being arranged one in the other; and
wherein a bottom of one cylinder arranged on an inside acts as a piston.

17. The apparatus according to claim 16, wherein the compressor further comprises:
a guide element operatively configured to receive and guide the first and second cylinders during relative motion between the axle and the chassis;
wherein the one cylinder arranged on the inside has a holding unit configured to fit onto an outer surface of the guide element in order to define the position of rest of the one cylinder; and
wherein the other cylinder arranged on an outside has a cylinder wall designed to abut against an inner wall of the guide element in order to define the position of the other cylinder arranged on the outside.

18. The apparatus according to claim 1, wherein the driver element is an adjustable length driver element.

19. The apparatus according to claim 18, further comprising at least one of an electric spindle drive and hydraulic intermediate element forming a part of the adjustable driver element.

20. A method for generating compressed air using a damping compressor operatively coupleable with an axle and a chassis of a vehicle, the damping compressor being configured to generate compressed air via damping of a relative motion between the axle and the chassis of the vehicle and including a compressor having first and second elements, the first element being connectable to the axle and the second element being connectable to the chassis or the first element being connectable to the chassis and the second element being connectable to the axle, a minimum or no air volume space arranged between the first and second elements when said elements are in a position of rest, a driver element operatively configured to increase an air volume upon relative motion between the axle and the chassis by entraining the first element in a stroke direction, and a restoring element operatively configured to move the first element counter to the stroke direction, in which case a reduction in the air volume occurs and compressed air is expelled from the compressor, the method comprising the acts of:
moving an axle and a chassis of a vehicle relative to one another; and
compressing air with the damping compressor by damping the relative motion between the axle and the chassis.

21. The method according to claim 20, wherein the compressing air act further comprises the acts of:
increasing an air volume upon relative motion between the axle and the chassis in a first stroke direction; and
reducing the increased air volume upon relative motion between the axle and the chassis in a second direction opposite the first stroke direction, whereby compressed air is generated.

22. A method for generating compressed air using a compressor comprising first and second elements, the first element being coupleable to an axle or chassis of a vehicle and the second element being coupleable to the other of the axle or chassis of the vehicle, wherein a minimum or no air volume space is configured between the first and second elements in a position of rest of the compressor, the method comprising the acts of:
increasing the air volume space upon relative motion between the axle and the chassis by moving the first element in a stroke direction to draw air into the air volume space;
reducing the increased air volume space by moving the first element counter to the stroke direction to compress the air; and
discharging the compressed air from the air volume space to a location outside the compressor.

* * * * *